(12) United States Patent
Eggers et al.

(10) Patent No.: US 6,780,522 B1
(45) Date of Patent: Aug. 24, 2004

(54) TRANSPARENT HIGH STRENGTH POLYAMIDE FILM

(75) Inventors: Holger Eggers, Freiburg (DE); Andreas Gasse, Walsrode (DE); Gregor Kaschel, Bomlitz (DE); Rainer Brandt, Walsrode (DE); Bernd Eilers, Bomlitz (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

(21) Appl. No.: 09/807,294

(22) PCT Filed: Oct. 4, 1999

(86) PCT No.: PCT/EP99/07325

§ 371 (c)(1),
(2), (4) Date: Apr. 10, 2001

(87) PCT Pub. No.: WO00/23506

PCT Pub. Date: Apr. 27, 2000

(30) Foreign Application Priority Data

| Oct. 16, 1998 | (DE) | 198 47 844 |
| Oct. 16, 1998 | (DE) | 198 47 845 |
| Jul. 28, 1999 | (DE) | 199 35 324 |
| Aug. 6, 1999 | (DE) | 199 37 117 |

(51) Int. Cl.[7] ............................................. B32B 27/34
(52) U.S. Cl. ........................ 428/474.9; 428/475.8; 428/476.1
(58) Field of Search ................. 428/474.7, 475.8, 428/476.1, 343, 411.1, 423.5, 435, 458, 474.4, 474.9, 475.5, 477.7; 524/230, 232, 606

(56) References Cited

U.S. PATENT DOCUMENTS

| 4,735,855 A | * | 4/1988 | Wofford et al. ............. 428/349 |
| 4,749,736 A | | 6/1988 | Khanna et al. ............. 524/230 |
| 5,496,918 A | * | 3/1996 | Khanna et al. ............. 528/323 |
| 5,504,128 A | * | 4/1996 | Mizutani et al. ............. 524/104 |
| 5,747,560 A | | 5/1998 | Christiani et al. ........... 523/209 |
| 6,346,285 B1 | * | 2/2002 | Ramesh ....................... 383/113 |

FOREIGN PATENT DOCUMENTS

| DE | 196 31 348 | | 2/1998 | |
| DE | 19 705 998 | | 8/1999 | |
| EP | 358415 | * | 3/1990 | ............ C08K/3/34 |
| EP | 0 358 415 | | 3/1990 | |
| EP | 0 810 259 | | 12/1997 | |
| EP | 0 818 508 | | 1/1998 | |
| JP | 62252426 A | * | 11/1987 | ........... C08G/69/16 |
| WO | WO 93/04117 | * | 3/1993 | ............ C08K/3/34 |
| WO | 93/04118 | | 3/1993 | |
| WO | 93/11190 | | 6/1993 | |

OTHER PUBLICATIONS

Printout from www.devicelink.com, May 2002, 7 pages.*

* cited by examiner

*Primary Examiner*—James J. Seidleck
*Assistant Examiner*—Melanie Bissett
(74) *Attorney, Agent, or Firm*—Norris McLaughlin & Marcus PA

(57) ABSTRACT

Described is a single or multi-layered film having at least one polyamide layer (I) containing dispersed nanoscale nucleating particles. The smallest components of the dispersed nanoscale nucleating particles in layer (I) have an extension of less than 100 nm in at least one randomly selected direction for each component, based on a weighted average of all components of the dispersed nanoscale nucleating particles. Crystalline structures emanating from the surface of the dispersed nanoscale nucleating particles are formed after the layer (I) is cooled from the molten state at a rate of from 10 to 20° C. per minute. The dispersed nanoscale nucleating particles are present in the polyamide layer (I) in an amount of from 10 ppm to 3000 ppm, based on the total weight of layer (I).

23 Claims, No Drawings

TRANSPARENT HIGH STRENGTH POLYAMIDE FILM

The present invention relates to a flexible single- or multi-layer film having at least one polyamide layer containing from 10 to 2000 ppm of a nano-disperse nucleating agent.

The film according to the invention is distinguished by good optical properties, high mechanical strength and good thermoformability. It can be produced particularly economically and reliably on conventional production installations, especially flat-film installations.

The film, as a single-layer film, may consist of only one PA layer or, as a multi-layer film, it may contain at least one PA layer nucleated and composed according to the invention.

Polyamide-containing films are widely used inter alia in the packaging of foodstuffs.

Advantages of the material polyamide are high mechanical strength, a good barrier against oxygen, carbon dioxide and other non-polar gases, and high temperature stability and scratch resistance. In addition, unstretched polyamide-containing films can be shaped thermally, that is to say deep awn into a shape suitable for accommodating goods placed therein. Films of polyamide are flexible and accordingly are able to adapt to the contours of the goods placed therein. That is important, for example, in the case of vacuum packaging.

Important properties of such films are a pleasing appearance, that is to say a high gloss and a low degree of cloudiness: in addition, high mechanical resistance, especially in the form of high resistance to damage by bending and folding, hereinafter referred to as bending strength, is required.

Polyamide is a semi-crystalline thermoplastic polymer. The polyamide structure that occurs in a film is dependent to a large degree on the processing conditions and on the composition of the polyamide. The slower the rate of cooling of the polyamide, the larger the crystalline structures that are able to form by means of crystallisation. Nucleation allows the rate of formation of nuclei in the crystallisation process to be increased and a more finely crystalline structure to be obtained.

Polyamide films may be produced by the flat-film or blown-film process. The flat-film process is in many cases preferred because it permits a markedly higher output per machine as compared with the blown-film process. Corresponding films can therefore generally be produced more economically.

However, thin polyamide films in particular require high casting roll temperatures for adequate web stability. A high degree of crystallinity thus occurs, which brings about the required strength. A disadvantage, however, is the cloudiness associated with the crystalline structure, as well as the relatively low gloss of the film.

For that reason, nucleated polyamides are used according to the prior art for the above-described applications. As compared with non-nucleated polyamide, such systems permit an improvement in the optical properties, the bending strength and the web stability of films produced therefrom as a result of the more rapid and more finely disperse crystallisation.

Application-related information from Bayer AG, as a well-known manufacturer of polyamide, summarises the relevant prior art in this field as follows [ATI KU 25304-9709 d,e/4332845, 1997, p. 3]:

"PA6 film products: [ . . . ] In order to take into account the increased demands of the market, it was necessary to develop tailored PA raw materials for film production. Accordingly, the following products inter alia have been developed in recent years: [ . . . ] Medium-viscosity PA 6 types having a relative solution viscosity in the range from 3.5 to 3.8, provided with processing and nucleating agents (crystal nucleus formers). The particular features of those products in comparison with non-nucleated, high-viscosity types are: [ . . . ]

Single-layer flat films in small thicknesses (from 15 $\mu$m) can be produced with greater web stability at higher takeoff speeds, a higher degree of crystallinity with a particularly fine-grained and dense spherulite structure better dimensional stability, less subsequent shrinkage as a result of crystallisation processes less cloudiness at higher chill-roll temperatures [ . . . ]

higher bending strength [ . . . ]"

With the polyamides nucleated according to the prior art too, the production output in the case of thin flat films continues to be limited by inadequate strength. Likewise, corresponding films continue to have a high degree of cloudiness as well as a slightly matt appearance to their surface.

The use of conventional nucleating systems, especially in the form of dispersed finely divided inorganic solid particles, is state of the art. WO 8802763 mentions in this connection especially talcum, mica, kaolin and, less preferably, substances such as asbestos, aluminium, silicates, silver bromide, graphite, molybdenum disulfide, lithium fluoride, sodium phenylphosphinate, magnesium oxide, mercuric bromide, mercuric chloride, cadmium acetate, lead acetate, silver chloride, kieselguhr and the like. The mentioned systems are added in concentrations of from one thousandth of a percent to one percent, based on the total weight of the nucleated polymer.

The addition of solid particles having a size in the region of less than one micrometre to polymer matrices and, especially, polyamides has likewise been known for a relatively long time. Such systems are described in concentrations of approximately from 0.3 to 10 wt. %. Advantages that are achieved are higher rigidity owing to the reinforcing action of the fillers and, where the fillers used are plate-like in structure, also a higher oxygen barrier owing to extended diffusion paths through the polymer matrix.

A nucleating action of nano-scale fillers is not described.

EP 358415 discloses a film of a polyamide resin with layered silicate uniformly dispersed therein, wherein the individual layers of the layered silicate may have thicknesses of about 1 nm and lateral lengths of up to 1 $\mu$m The layers are present in the polyamide matrix separated by suitable opening and are at distances of about 10 nm from one another. Films produced using that material in concentrations of from 1.2 to 6.5 wt. % layered silicate are distinguished as compared with materials of pure polyamide 6 by a markedly increased oxygen barrier and rigidity. The frictional properties are improved. The transparency of single-layer amorphously quenched flat films as well as blown films with water cooling having the structure polyamide/adhesion promoter/PE-LD remains unchanged as compared with pure polyamide 6. By reference to given examples of PA6 films with a stepped content of layered silicate, the significant fall in bending strength and the increase in rigidity in the range up to 3.0 wt. % silicate becomes clear. Accordingly, such structures are generally not suitable for the demands of the present case.

WO 9304118, and WO 9311190 and WO 9304117 of the same Applicant, disclose polymer nano-composites likewise having plate-like particles with thicknesses in the region of a few nanometres, which are obtained not by introduction by polymerisation but by mechanical incorporation. There are described in particular composites of PA6 and montmorillonite and of PA6 and silicates having a filler content of from 0.27 to 9 wt. %. However, measurements carried out on rods of the corresponding material did not yield any increase in bending strength with a silicate content of 0.27%. Such materials can also be processed to films. A parallel orientation of the plate-like particles to the surface of the film is advantageous in this case. Applications as a single-layer film and also the possibility of producing multi-layer films are described. The films produced from that material may optionally be stretched in order to achieve even better orientation of the nano-particles. The main advantage of such films over those without nanoscale particles is a higher rigidity, which is always associated, however, with a markedly reduced stretchability. In view of the required high bending strength, therefore, such systems are generally also excluded for the demands of the present case.

EP 818508 discloses a mixture of from 60 to 98% PA MXD6 with from 2 to 40% of an aliphatic polyamide that in turn contains inorganic particles of a size in the nanometre range. Mixtures containing especially PA 6 as the aliphatic polyamide are described. In addition, multi-layer films are described as mouldings that can be produced therefrom. All the structures mentioned have the advantage of a high oxygen barrier, which also is not impaired by sterilisation. As compared with a flat film of pure PA6, a film according to the invention having the structure PA 6//(80% PA MXD6+ 20% PA6 containing nanoparticles)//PA 6 exhibits no notable improvement in transparency. The main disadvantage of such structures having a high content of PA MXD6 is again the low bending strength and puncture resistance of the material. Accordingly, such structures are not suitable for the demands of the present case.

EP 810259 likewise describes a polyamide moulding composition containing nano-disperse fillers. By addition of sufficiently finely divided oxides, oxihydrates or carbonates, the desired barrier action of the polyamide can be improved. The particles preferably have a diameter of less than 100 nm and are used in concentrations of from 0.1 to 10 wt. %, preferably from 1 to 3 wt. %. The patent also describes multi-layer films having at least one layer of that moulding composition for improving the oxygen barrier. The optical properties of a film of a polyamide 6 filled with 1 wt. % silicate deteriorate significantly, however, as compared with the system without additive. The elongation at tear also deteriorates, and the tensile modulus falls. Accordingly, corresponding films are likewise generally not suitable for the present application.

The object was to provide a flexible polyamide film that permits a higher production output than conventional types on flat-film installations of the conventional type. In addition, the film is to exhibit high gloss and good transparency as well as a sufficiently high bending strength.

That object was achieved according to the invention by the provision of a single- or multi-layer film having at least one layer (I) of a polyamide with nano-scale nucleating particles dispersed therein, which film is characterised in that the smallest particle constituents forming a rigid unit in the dispersion have, as a number-weighted average of all the constituents, a dimension no greater than 100 nm in at least one direction that is randomly selectable for each constituent, when the layer (I) is cooled from its fully molten state at a cooling rate of from 10° to 20° C. per minute, crystalline structures that emanate from the surface of the particles are formed, the amount by weight of the particles, based on the total weight of the polyamide forming the layer (I), is from 10 ppm to 2000 ppm, the polyamide forming the layer (I) contains at least 90% polyamide 6, based on the total mass of the polyamide in that layer.

In addition to one or more layers (I), the film according to the invention may also contain further polyamide-containing layers that have a content of nano-scale nucleating agent of less than 10 ppm or that are completely without nano-scale nucleating agent. However, that does not bring any advantages within the context of the invention.

The polyamide forming the layer (I) and further layers consisting of polyamide may contain, in addition to polyamide 6, polyamides of the types polyamide 10, polyamide 12, polyamide 66, polyamide 610, polyamide 61, polyamide 612, polyamide 6/66, polyamide 6I/6T, polyamide MXD6, polyamide 6/6I, polyamide 6/6T, polyamide 6/IPDI or other aliphatic or aromatic homo- and co-polyamides or mixtures thereof. Layer (I) preferably contains pure polyamide 6. Too high contents of other polyamides impair the web stability of the film in particular.

The polyamide layers of the film according to the invention may also contain further conventional additives that improve the functionality of the film, such as lubricants, especially ethylene-bisstearylamide. The outer layer may additionally contain anti-blocking agents. These are known solid inorganic particles that stand out from the outer surface of the surface and in that manner improve the sliding behaviour of the film. Silicon dioxide, calcium carbonate, magnesium silicate, aluminium silicate, calcium phosphate, talcum and the like are suitable for that purpose. Of those, silicon dioxide is preferably used Effective amounts are in the range from 0.1 to 2 wt. %, preferably from 0.1 to 0.8 wt. %. The mean particle size is from 1 to 15 μm, particles having a spherical shape being especially suitable.

The amount by weight of the nano-scale nucleating particles, based on the total weight of the composition forming the layer (I), is preferably from 50 to 1000 ppm, preferably from 100 to 500 ppm.

Preference is given to particles whose smallest constituents forming a rigid unit in the dispersion have a dimension in two randomly selectable directions that are perpendicular to each other of at least ten times the size of the constituents in the direction having the smallest dimension of the constituent. The thickness of those plate-like particles is preferably less than 10 nm. The particles used in layer (I) are preferably layered silicates. They may be selected from the group consisting of phyllosilicates such as magnesium silicate or aluminium silicate, as well as montmorillonite, saponite, beidellite, nontronite, hectorite, stevensite, vermiculite, halloysite or their synthetic analogues.

The film according to the invention may be single- or multi-layer in structure. A multi-layer form contains at least one layer (I). A form having more than one layer (I) may contain layers (I) of different compositions.

In the case of a multi-layer form of the film according to the invention, it is advantageous to provide one layer (I) as the outer layer owing to its high gloss.

In particular, films that consist only of a polyamide layer or that contain only polyamide-containing layers are possible. Such polyamide films preferably have thicknesses from 5 to 100 μm, especially from 10 to 50 μm and more especially from 13 to 30 μm. They may optionally be provided with other layers in further processing steps.

A multi-layer form of the film according to the invention may have a single- or multi-layer sealing layer (V) on one outer side of the multi-layer film in order to facilitate its heat-sealability. Accordingly, the sealing layer (V) forms the inner side of the multi-layer film according to the invention facing the goods placed therein. In a preferred form, the sealing layer (V) contains the polymers or mixtures of polymers, conventionally used as sealing medium, from the group consisting of copolymers of ethylene and vinyl acetate (E/VA), preferably having a vinyl acetate content, based on the total weight of the polymer, of not more than 20%, copolymers of ethylene and unsaturated esters such as butyl acrylate or ethyl acrylate (E/BA and E/EA), copolymers of ethylene and unsaturated carboxylic acids (E/AA, E/MAA), preferably having a content of the carboxylic acid monomer, based on the total weight of the polymer, of not more than 15%, in a further preferred form of not more than 8%, salts of the copolymers of ethylene and unsaturated carboxylic acids, especially E/MAA, (ionomers), preferably having a content of the carboxylic acid comonomer, based on the total weight of the ionomer, of not more than 15%, in a further preferred form of not more than 10%, low-density polyethylene (PE-LD), preferably having a density of at least 0.91 g/cm$^3$ and at most 0.935 g/cm$^3$, high-density polyethylene (PE-HD), copolymers (PE-LLD) of ethylene and α-olefins having at least 3 carbon atoms, for example butene, hexene, octene, 4-methyl-1-pentene. The copolymers (PE-LLD) of ethylene and α-olefins may be prepared using conventional catalysts or using metallocene catalysts. Of those copolymers, special preference is given to copolymers (PE-LLD) of ethylene and α-olefins having a density of at least 0.90 g/cm$^3$ and at most 0.94 g/cm$^3$.

In addition to the polyamide-containing layer(s) and, optionally, the sealing layer (V), the multi-layer film according to the invention may also contain one or more EVOH-containing layers (III) for improving the oxygen-barrier properties, the layers (III) preferably containing at least 50 wt. %, based on the total weight of the EVOH-containing layer in question, of an EVOH containing at least 85 mol % and at most 40 mol % vinyl acetate that has been saponified to the extent of at least 90%. In an especially preferred form, an EVOH-containing layer (III) is placed between two polyamide-containing layers.

In addition to the polyamide-containing layers, optionally the sealing layer and optionally at least one EVOH-containing layer, the film according to the invention may contain adhesion-promoting layers (IV). Such an adhesion-promoting layer is preferably a lining adhesive based on polyurethanes or polyester urethanes, or an extrudable adhesion promoter.

In addition to the polyamide-containing layers, optionally the sealing layer and optionally at least one EVOH-containing layer and adhesion-promoting layers, the multi-layer film according to the invention may contain further polymeric layers.

The film according to the invention can be produced on conventional installations for the production of single- or multi-layer films.

The multi-layer film according to the invention may also be subjected to a stretching operation once it has been extruded. Orientation may take place only in the longitudinal direction, only in the transverse direction, first in the longitudinal and then in the transverse direction, in the longitudinal and transverse directions simultaneously, or in combinations of those steps. The stretching may be carried out for the entire multi-layer film or for partial composites therefrom.

The multi-layer film according to the invention may be provided with a layer of a metal oxide, which can be represented by MOx, on the outside or between two inner layers. That layer preferably has a thickness of from 5 to 200 nm. In the mentioned empirical formula, x is from 1 to 2.5; M is preferably silicon, iron or aluminium.

The film according to the invention may also be printed on the outside, on the inside or between individual layers.

With the film according to the invention it is possible, surprisingly, to provide a film that, as a flat film, permits a considerably improved web stability and markedly higher take-off speeds as compared with films according to the prior art. This allows better use to be made of existing resources.

In contrast to conventional nucleated polyamides, the film according to the invention additionally has better transparency. The film is flexible and pliable and is distinguished by a high bending strength.

The fact that the mentioned properties were obtained with the addition of only the smallest amounts of nano-scale nucleating fillers was unexpected to the inventor.

Contrary to the published prior art, according to which nucleating agents do not lead to any further increase in effectiveness above a given, system-specific concentration, adding the nucleating nano-scale fillers used in the present case in too great an amount results in the film becoming very brittle. In addition, when the film is produced as a flat film, waves are formed on the casting roll, which results in unusable films. It was not to be expected that it would be possible only by using the nano-scale nucleating agents in a low concentration range to avoid the disadvantages of adding too great an amount, while retaining the advantages.

EXAMPLES

Six single-layer polyamide 6 flat films having a thickness of 15 µm were produced on a flat-film installation of the conventional type. The casting roll had a temperature of 125° C. and a circumferential speed of 140 m/min. in each case. The dwell time of the film on the casting roll was 0.4 second.

The six samples differ in respect of the content of nano-scale nucleating agent. A polyamide 6 nucleated in the conventional manner with talcum was used as the comparison sample.

In detail, the following films were produced:

Comparison Example 1 (C1)

Film of polyamide 6 containing 600 ppm of ethylene-bisstearylamide and approximately 150 ppm of talcum as the nucleating agent. The polyamide used has a relative solution viscosity of 3.8 in m-cresol.

Example 2 (E2)

Film of a mixture of two polyamides, 99 wt. % of the mixture being formed by the polyamide of Comparison Example 1 and 1 wt. % of the mixture being formed by a polyamide 6 having a relative solution viscosity of 3.6 in m-cresol and containing 2 wt. % of layered silicate (montmorillonite) dispersed in nano-scale plate form. The layered silicate of the polyamide 6 has thicknesses of approximately one nanometre and plate diameters of from 100 to 1000 nm. In contrasted transmission electron microscope images, crystallites emanating from the surface of the silicate plates and grown into the polyamide matrix can be seen in the case of Examples and Comparison Examples 2 to 6 prepared here.

A content of nano-scale nucleating agent of 200 ppm is obtained.

Example 3 (E3)

Film as in Example 2, but consisting of a polyamide 6 having a mixing ratio of the polyamide 6 types used, listed in the same order, of 95 to 5 wt. % instead of 99 to 1 wt. %. A content of nanoscale nucleating agent of 1000 ppm is obtained.

Example 4 (E4)

Film as in Example 2, but consisting of a polyamide 6 having a mixing ratio of the polyamide 6 types used, listed in the same order, of 92.5 to 7.5 wt. % instead of 99 to 1 wt. %. A content of nano-scale nucleating agent of 1500 ppm is obtained.

Comparison Example 5 (C5)

Film as in Example 2, but consisting of a polyamide 6 having a mixing ratio of the polyamide 6 types used, listed in the same order, of 70 to 30 wt. % instead of 99 to 1 wt. %. A content of nano-scale nucleating agent of 6000 ppm is obtained.

Comparison Example 6 (C6)

Film of polyamide 6 having a relative solution viscosity of 3.6 in m-cresol and containing 2 wt. % of layered silicate (montmorillonite) dispersed in nanoscale plate form. It is the polyamide 6 used in Example 2 in a polyamide mixture in an amount of 1 wt. %. It has a content of nano-scale nucleating agent of 20,000 ppm.

The following physical, production and application properties were determined on the samples that were produced, as follows:

The bending strength at a temperature of 23° C. and a relative humidity of 50%, by rolling up a portion of the sample in a single layer to form a cylinder having a length of 198 mm and a circumference of 280 mm and clamping it at both ends in appropriately shaped holding devices. The free length of the cylinder formed by the film between the holding devices is 192 mm. With simultaneous rotation through 440° about the axis of symmetry describing the cylinder, the holding devices are brought together to a distance of 40 mm with a given number of cycles and a frequency of 35 cycles per minute. The films to be tested are stored beforehand for 7 days in a climate of 23° C. and 50% relative humidity. The number of bending fractures that have thus formed in the film after the predetermined number of strokes can be determined by wetting one side of the film with ammonia solution and at the same time bringing the other side of the film into contact with a sheet of blueprint paper. The number of blue-black spots, caused by ammonia, that can be seen on the blueprint paper after 15 minutes is assigned to the number of bending fractures in the section of film being tested. The value is obtained as the average of the individual values from two test samples.

Cloudiness according to ASTM D 1003.

The gloss on the outside of the film at an angle of 200 according to DIN 67530.

Producibility as a flat film under the mentioned conditions. In particular, the removal of the film from the casting roll in the region of the edge fixing and the stability and flatness of the film were evaluated. In addition, the surprising observation was made that films with a high degree of filling form an undesirable wave structure on the casting roll. The occurrence of that structure resulted in a negative assessment. The results were divided into the categories ++ very good, + good, − poor.

The results are summarised in the table below:

Properties of Examples and Comparison Examples

| Characteristic (unit) | Example (E) or Comparison Example (C) PA6 single-layer films, thickness = 15 µm | | | | | |
|---|---|---|---|---|---|---|
| | C1 | E2 | E3 | E4 | C5 | C6 |
| Content of nano-scale nucleating agent (ppm) | 0 | 200 | 1000 | 1500 | 6000 | 20,000 |
| Gloss (gloss units) | 93 | 123 | 127 | 134 | 141 | 152 |
| Cloudiness (%) | 5.1 | 2.3 | 2.1 | 1.6 | 1.7 | 1.9 |
| Number of holes after 500 strokes | 3.0 | 2.5 | 4.0 | 6.5 | 18.5 | >20 |
| Producibility | −* | + | ++ | ++ | −** | −** |

Notes regarding producibility:
−* The film sticks to the casting roll in the edge region and over-stretches when removed.
−** The film forms a longitudinally oriented wave structure on the casting roll.

What is claimed is:

1. Multi-layer film having at least one layer (I) of polyamide with nano-scale nucleating particles dispersed therein, wherein said nano-scale nucleating particles have an aspect ratio of at least 10 in two randomly selectable directions, and, as a number-weighted average, a dimension no greater than 100 nm in at least one direction that is randomly selectable for each consent, having crystalline structures that emanate from the surface of the particles, the amount by weight of the particles, based on the total weight of the polyamide forming the layer (I), is from 10 ppm to 2000 ppm, the polyamide forming the layer (I) contains at least 90% polyamide 6, based on the total mass of the polyamide in that layer and comprising further polyamide-containing layers (II) containing no or less than 10 ppm nano-scale nucleating agent.

2. The film of claim 1 wherein layer (I) contains, in addition to polyamide 6, a polyamide selected from the group consisting of, polyamide 10, polyamide 12, polyamide 66, polyamide 610, polyamide 61, polyamide 612, polyamide 6/66, polyamide 6I/6T, polyamide MXD6, polyamide 6/6I, polyamide 6/6T, polyamide 6/IPDI, copolymers of the monomers forming these polymers, and mixtures thereof.

3. The film of claim 1 wherein the particles used in layer (I) are layered silicates.

4. The film of claim 1 wherein said film contains one or more EVOH-containing layers (III).

5. The film of claim 1 wherein said film has an at least singe-layer sealing layer (V) on one outer side of the multi-layer film.

6. The film of claim 1 wherein said film contains one or more adhesion-promoting layers (IV).

7. The film of any one of the preceding claims further comprising one or more further polymeric layers.

8. The film of claim 1 wherein said film has only polyamide-containing layers.

9. The film of claim 8 wherein said film has a thickness of from 13 to 30 µm.

10. The film of claim 1 wherein said film has been produced in the form of a flat film.

11. The film of claim 1 wherein layer (I) forms an outer layer of the film.

12. The film of claim 1 wherein at least one layer (I) is subjected, after extrusion, to a stretching operation selected from: stretching only in the longitudinal direction; stretching only in the transverse direction; stretching first in the longitudinal and then in the transverse direction; stretching in the longitudinal and transverse directions simultaneously; and combinations thereof.

13. A method of packaging foodstuffs on a form-fill-seal machine, which comprises packaging said foodstuffs on said form-fill-seal-machine with a multi-layer film of claim 1.

14. The multi-layer film of claim 1, wherein said at least one layer (I) is pure polyamide 6.

15. The multi-layer film of claim 1, wherein the smallest constituents of said nano-scale nucleating particles forming rigid unit in the dispersion have a dimension in two randomly selectable directions that are perpendicular to each other of at least ten times the size of the constituents in the direction having the smallest dimension of the constituent.

16. The multi-layer film of claim 1, wherein said particles are selected from the group consisting of phyllosilicates, montmorillonite, saponite, beidellite, nontronite, hectorite, stevensite, vermiculite, halloysite and their synthetic analogs.

17. The multi-layer film of claim 16, wherein said particles are phyllosilicates and said phylosilicates are magnesium silicate or aluminum silicate.

18. The multi-layer film of claim 1, wherein said amount of said particles is from 50–1000 ppm.

19. The multi-layer film of claim 18, wherein said amount of said particles is from 100–500 ppm.

20. A method for producing the multi-layer film of claim 1, which comprises producing said film on a flat film installation and cooling said at least one layer (I) from a fully Molten state at a cooling rate of from 10° to 20° C. per minute.

21. The multi-layer film of claim 1, wherein said film comprises, in addition to said at east one layer (I) and said at least one further polyamide layer (II) containing no less than 10 ppm nano-scale nucleating agent, at least one or more EVOH-containing layer (III), at least one adhesion promoting layer (IV) and at least one single-layer sealing layer (V) on one outer side of the multi-layer film.

22. The film of claim 21, further comprising one or more further polymeric layers.

23. Multi-layer film having at least one layer (I) of polyamide with nanoscale nucleating particles dispersed therein, wherein said nano-scale nucleating particles have an aspect ratio of at least 10 in two randomly selectable directions, and, as a number-weighted average, a dimension no greater than 100 nm in at least one direction that is randomly selectable for each constituent, having crystalline structures that emanate from the surface of the particles, the amount by weight of the particles, based on the total weight of the polyamide forming the layer (I), is from 10 ppm to 2000 ppm, the polyamide forming the layer (I) contains at least 90% polyamide 6, based on the total mass of the polyamide in that layer and wherein said film has only polyamide-containing and EVOH-containing layers.

* * * * *

UNITED STATES PATENT AND TRADEMARK OFFICE
CERTIFICATE OF CORRECTION

PATENT NO. : 6,780,522 B1
DATED : August 24, 2004
INVENTOR(S) : Eggers et al.

It is certified that error appears in the above-identified patent and that said Letters Patent is hereby corrected as shown below:

Column 1,
Lines 22-23, "deep awn" should read -- deep-drawn --

Column 2,
Line 49, "1 $\mu$m The" should read -- 1 $\mu$m. The --

Column 4,
Line 35, "used Effective" should read -- used. Effective --

Column 8,
Line 31, "for each consent" should read -- for each constituent --

Signed and Sealed this

Fifth Day of April, 2005

JON W. DUDAS
*Director of the United States Patent and Trademark Office*